March 30, 1926.
D. A. MURRAY
1,579,022
PHOTOGRAPHIC CAMERA
Filed Nov. 9, 1922
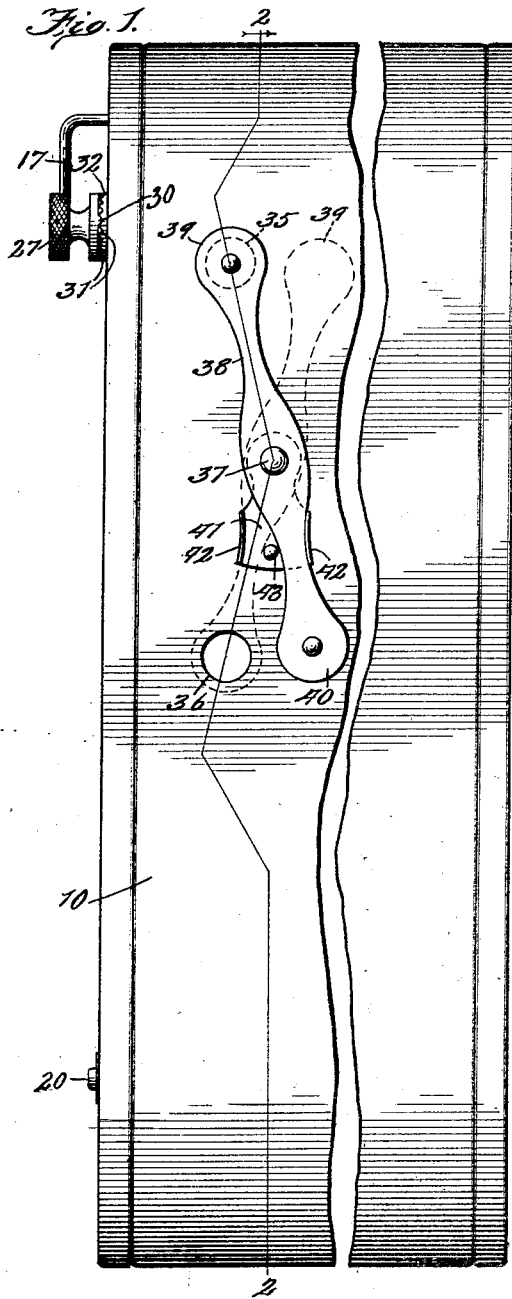
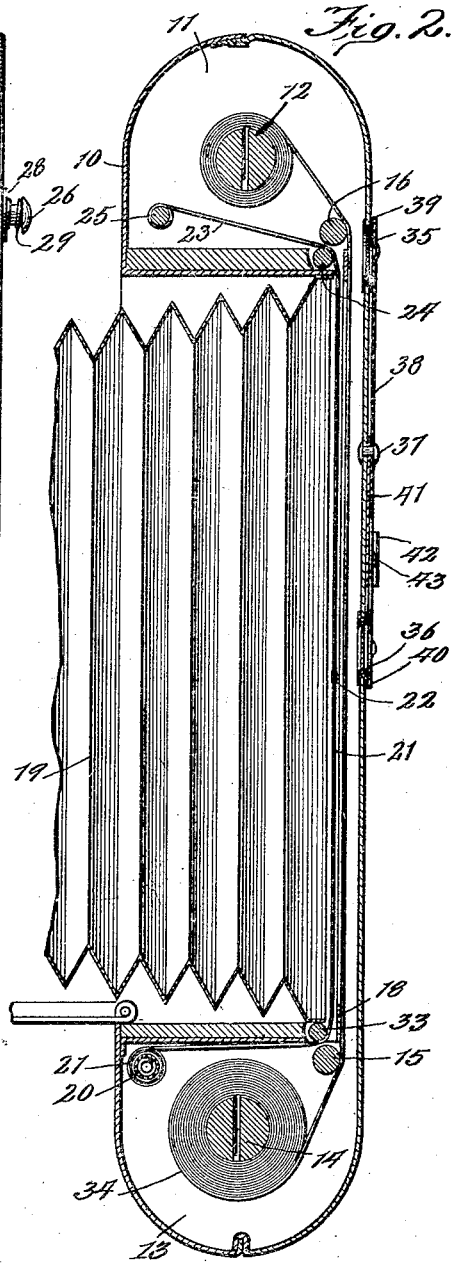
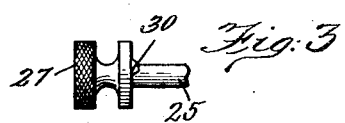
Inventor:
David A. Murray,
By John Howard McElroy
his Atty.

Patented Mar. 30, 1926.

1,579,022

UNITED STATES PATENT OFFICE.

DAVID A. MURRAY, OF SANTA MONICA, CALIFORNIA.

PHOTOGRAPHIC CAMERA.

Application filed November 9, 1922. Serial No. 599,767.

*To all whom it may concern:*

Be it known that I, DAVID A. MURRAY, a citizen of the United States, and a resident of Santa Monica, in the county of Los Angeles and State of California, have invented certain new and useful Improvements in Photographic Cameras, of which the following is a specification.

My invention is concerned with cameras of the roll-film type, and is designed to produce a camera in which either a full-sized or a half-sized picture can be made, and the film accurately positioned for either size.

To illustrated my invention, I annex hereto a sheet of drawings, in which the same reference characters are used to designate identical parts in all the figures, of which,—

Fig. 1 is a rear elevation of a camera embodying my invention;

Fig. 2 is a sectional view on the line 2—2 of Fig. 1; and

Fig. 3 is a detail, showing the construction of the screen-adjusting knob.

I have shown my invention as applied to a well known type of camera in which the oblong casing 10 is provided at one end with the chamber 11 to hold the exposed film-roll 12, and at the other end with a similar chamber 13 to receive the non-exposed film-roll 14, the film being drawn from the roll 14 to the roll 12 over the customary guide rollers 15 and 16 by turning the customary handle 17. The normal area for the exposure of the film is determined by the size of the central opening in the customary rectangular frame 18 secured in the framework directly in front of the film and between it and the customary bellows 19 to which the object glass (not shown) is connected in the customary manner. The construction so far described is old and well known, and, per se, forms no part of my invention.

Normally, the exposure will be as large as possible and extend the length of the opening in the frame 18. In order to take a half-sized picture, I provide the following screen mechanism and apparatus for locating the position of the film: Journaled in the casing 10 above the roller 14 is the small spring roller 20, constructed like the ordinary curtain roller, but of course on a smaller scale, and on this roller is normally wound the dead-black curtain 21, substantially the width of the frame 18, so that it extends entirely across the width of the opening therein between the film 34 and the bellows 19, and this curtain is provided at its outer end with the bar 22, which has connected to the ends thereof the threads or small cords 23, which extend over the guide roll 24 journaled as shown, in the casing, and have their ends attached to the roll or shaft 25 journaled in the end of the casing 10, as shown, the shaft at one end having the head 26 and at the other end the thumb piece 27. Interposed between the head 26 and the bearing 28 in the end of the casing is the helically-coiled expanding spring 29, which tends to keep the lug 30 on the thumb piece 27 (see Fig. 3) securely engaged with one of the radially-extending notches 31 formed in the outer face of the bearing 32 for the shaft 25 mounted in that end of the casing. The curtain 21 is guided over the roller 33 corresponding to the roller 24. With this construction, it will be obvious that by turning the thumb piece 27, the shaft 25 can be rotated so as to draw the curtain 21 from its normal position, in which it is entirely below the lower edge of the opening in the frame 18, to the position shown, where it covers one-half of said opening, and limits the exposure to the upper half of that portion of the film covering the frame 18. With this adjustment of the curtain, it will be obvious that the picture made will be half size, and when it is desired to run the curtain back to its normal position, all that is necessary is to pull out the thumb piece 27 until the lug 30 is disengaged from the notches 31 so that the spring in the roller 20 can wind the curtain up on said roller and get it out of the way.

It is necessary to furnish some indication to the user, of the position of the film 34 relative to the frame 18. It will be understood that the film 34 is provided with the customary numerals spaced apart the length of the film necessary for a full-size exposure and visible as the film is turned, through the customary aperture 35 located in the back of the casing 10 and covered with some colored transparent material to cut out the actinic rays of light, while permitting the numbers on the film to be visible through the opening. At a distance equal to half the length of film necessary for a full-size exposure and directly beneath the aperture 35, I provide another similar aperture 36, likewise covered with colored glass or other translucent material to intercept the actinic rays, and between the two apertures, preferably at one side thereof, I pivot at 37 the bar 38, preferably made of spring metal and having the rounded ends 39 and 40 adapted to cover the apertures 35 and 36, respectively, one at a time. Accurately to position the bar with the ends over said apertures, I place beneath the bar the metallic plate 41, which has at its ends the two side lugs 42, and half way between these side lugs the rounded lug 43, so that the bar can be stopped by the lugs 42 and swing over the lug 43 with a little friction, so that the bar will be held in position accurately either in the full-line position shown in Fig. 1, where the aperture 35 is covered and the aperture 36 exposed, or in the dotted-line position shown, where the aperture 36 is covered and the aperture 35 is exposed.

The operation of the camera in taking a half-size picture will be readily apparent. Assuming that a full-size exposure has been made and it is desired to make a half-size exposure; as usual the handle 17 will have been turned until the next number on the film 34 has been brought to the aperture 35, which means that a complete length of the film is in position to be exposed through the opening in the frame 18. I now turn the thumb piece 27 to draw the curtain 21 out to the position shown in Fig. 2, where half of the film over the opening in the frame 18 is covered, and if the exposure is now made it will produce a picture of half size. Then, instead of turning the handle 17 till the next number on the back of the film appears at the aperture 25, I shift the bar 38 so that its end 39 shall cover that aperture 35 and the aperture 36 be uncovered (the condition shown in the full-line position of Fig. 1), and turn the handle 17 till that next film number appears through this aperture 36, thus advancing the film a distance equal to half the length of a full-size exposure, and removing from the opening in the frame 18 just the half-length of film which has been exposed. Then I disengage the lug 30 on the thumb piece 27, permitting the spring-actuated roller 20 to wind up the opaque curtain 34, drawing it entirely away from the opening in the frame 18. Now the camera is again in the normal condition, with a full length of unexposed film presented to the opening in the frame 18, so if next a full-size exposure is desired, it can be made just as in an ordinary camera, and the handle 17 turned as usual to draw the exposed film away from the opening in the frame 18. However, this time the handle will be turned till the number on the film appears at the aperture 36, which is the one that it now open. Proceeding, the camera can be used indefinitely in this condition, just like an ordinary camera for full-size exposures, by simply using this aperture 36, instead of the aperture 35, to locate the number on the back of the film. But if still again a half-size exposure is described, I proceed as before to turn the thumb piece 27 and draw up the curtain 21 till it covers half the opening in the frame 18, then make the exposure, which strikes only the upper half of the film. Then I shift the bar 38 so that it covers the aperture 36 and uncovers the aperture 35, and turn the handle 17 till the number on the back of the film appears at that aperture 35,—also releasing the lug 30 of the thumb piece 27 from engagement so as to allow the spring roller 20 to draw the curtain away from the opening in the frame 18. I can thus proceed indefinitely to take either full-size or half-size pictures by merely observing after a half-size exposure to withdraw the curtain, shift the spring bar 38 so as to change the aperture that is uncovered, and bring the number on the back of the film to appear at that uncovered aperture,—and after full-size exposures using whichever aperture was uncovered when the exposure was made without shifting the bar While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a camera, the combination with a casing adapted to have a numbered roll-film mounted therein and provided with an aperture through which the numbers may be seen as full-length sections of film are successively brought into position for exposure, and an auxiliary aperture so located that the numbers may be seen when the film is in an intermediate position, of screen mechanism manipulated from the exterior of the casing adapted to be brought into or out of use so as to cut down the area of exposure to an automatically-determined fraction of a full-length section of the film, and a cover for said apertures constructed so that it can be brought into co-operation with only one of said apertures at a time thereby furnishing an indication as to whether the film is being operated for full length or fractional length exposures.

2. In a camera, the combination with a casing adapted to have a numbered roll-film mounted therein and provided with an aperture through which the numbers may be seen as full-length sections of film are successively brought into position for exposure, and an auxiliary aperture so located that the numbers may be seen when the film is in an intermediate position, of screen mechanism manipulated from the exterior of the casing adapted to be brought into or out of use so as to cut down the area of exposure to an automatically-determined fraction of a full-length section of the film, a cover for said apertures adapted to be brought into co-operation with one of said apertures at a time, and means for holding the cover in either of its two positions.

3. In a camera, the combination with a casing adapted to have a numbered roll-film mounted therein and provided with an aperture through which the numbers may be seen as full-length sections of film are successively brought into position for exposure, and an auxiliary aperture so located that the numbers may be seen when the film is in an intermediate position, of screen mechanism adapted to be brought into or out of use so as to cut down the area of exposure to a fraction of a full-length section of the film, and a cover for said apertures adapted to be brought into co-operation with one of said apertures at a time, said cover consisting of a bar pivoted on the casing between said apertures and shaped so that when one end covers its adjacent aperture, the other one will be exposed, and vice versa.

4. In a camera, the combination with a casing adapted to have a numbered roll-film mounted therein and provided with an aperture through which the numbers may be seen as full-length sections of film are successively brought into position for exposure, and an auxiliary aperture so located that the numbers may be seen when the film is in an intermediate position, of screen mechanism adapted to be brought into or out of use so as to cut down the area of exposure to a fraction of a full-length section of the film, and a cover for said apertures adapted to be brought into co-operation with one of said apertures at a time, said cover consisting of a spring-metal bar pivoted on the casing between said apertures and shaped so that when one end covers its adjacent aperture the other one will be exposed, and vice versa, together with abutments carried by the casing between which the cover rests to be yieldingly held in either position.

In witness whereof, I have hereunto set my hand this 17th day of October 1922.

DAVID A. MURRAY.